United States Patent
Wilfong et al.

(10) Patent No.: US 12,288,186 B2
(45) Date of Patent: Apr. 29, 2025

(54) AUTOMATIC INVENTORY CREATION VIA IMAGE RECOGNITION AND OVERLAY

(71) Applicant: Nokia Solutions and Networks Oy, Espoo (FI)

(72) Inventors: Gordon Wilfong, Portland, OR (US); Yihao Zhang, Chatham, NJ (US); Iraj Saniee, New Providence, NJ (US); Maria Laura Maag, Sainte Genevieve des Bois (FR)

(73) Assignee: Nokia Solutions and Networks Oy, Espoo (FI)

( * ) Notice: Subject to any disclaimer, the term of this patent is extended or adjusted under 35 U.S.C. 154(b) by 344 days.

(21) Appl. No.: 17/890,488

(22) Filed: Aug. 18, 2022

(65) Prior Publication Data
US 2022/0398531 A1    Dec. 15, 2022

(51) Int. Cl.
G06Q 10/087    (2023.01)
G06V 10/10    (2022.01)
G06V 20/60    (2022.01)

(52) U.S. Cl.
CPC ......... G06Q 10/087 (2013.01); G06V 10/16 (2022.01); G06V 20/60 (2022.01)

(58) Field of Classification Search
CPC ...... G06Q 10/087; G06V 10/16; G06V 20/60; G06V 10/462; G06V 20/17; G06V 20/52
See application file for complete search history.

(56) References Cited

U.S. PATENT DOCUMENTS

| 7,184,072 B1 | 2/2007 | Loewen et al. |
| 9,704,292 B2 | 7/2017 | Priest et al. |
| 2018/0276241 A1* | 9/2018 | Hebbalaguppe ........ G06F 16/29 |

(Continued)

FOREIGN PATENT DOCUMENTS

| KR | 101875047 B1 | 7/2018 |
| WO | 2021/113268 A1 | 6/2021 |
| WO | WO-2023034441 A1 * | 3/2023 |

OTHER PUBLICATIONS

Isa et al., "It's a bird . . . It's a plane . . . It's a drone . . . : Telecommunication Tower Inspection Using Drone", 6th International Conference on Research and Innovation in Information Systems (ICRIIS), Dec. 2-3, 2019, 5 pages.

(Continued)

Primary Examiner — A. Hunter Wilder
(74) Attorney, Agent, or Firm — Harness, Dickey & Pierce, P.L.C.

(57) ABSTRACT

A method for automatically creating an equipment inventory from a plurality of images of a site. The method includes receiving, by a processor, the plurality of images of the site, labeling, by the processor, equipment present in each image of the plurality of images of the site, creating, by the processor, an overlap curve for neighboring images of the plurality of images of the site, determining, by the processor, a useful image of each side of the site based on the overlap curve, the useful image including a subset of the plurality of images, creating, by the processor, an overlay of equipment in the useful image of each side of the site, counting, by the processor, equipment present in the overlay of each side of the site, and generating, by the processor, the equipment inventory by adding a number of equipment counted in the overlay of each side of the site.

12 Claims, 8 Drawing Sheets

(56) References Cited

U.S. PATENT DOCUMENTS

| | | |
|---|---|---|
| 2020/0082168 A1 | 3/2020 | Fathi et al. |
| 2020/0327653 A1 | 10/2020 | Leordeanu et al. |
| 2021/0019910 A1 | 1/2021 | Huyn et al. |
| 2022/0130145 A1* | 4/2022 | Connary ................ G06T 15/20 |

OTHER PUBLICATIONS

Lowe, "Distinctive Image Features from Scale-Invariant Keypoints", International Journal of Computer Vision, vol. 60, No. 2, 2004, pp. 91-110.
Kalman, "A New Approach to Linear Filtering and Prediction Problems", Transactions of the ASME—Journal of Basic Engineering, vol. 82, No. 1, Mar. 1960, pp. 35-45.
Kalman et al., "New Results in Linear Filtering and Prediction Theory", Journal of Basic Engineering, vol. 83, No. 1, Mar. 1961, pp. 95-108.
Office action received for corresponding Finnish Patent Application No. 20216176, dated Jun. 20, 2022, 9 pages.
Brown et al., "Recognising Panoramas", Proceedings Ninth IEEE International Conference on Computer Vision, Oct. 13-16, 2003, 8 pages.
Extended European Search Report received for corresponding European Patent Application No. 22203253.4, dated Mar. 21, 2023, 9 pages.

* cited by examiner

| METHOD ACCORDING TO EXAMPLE EMBODIMENTS | PRECISION | RECALL | F1 ACCURACY |
|---|---|---|---|
| 9AT0775C | 100% | 87% | 93% |
| 9MT2521A | 86% | 100% | 92% |
| CH69006A | 90% | 100% | 95% |
| SE07235C | 100% | 100% | 100% |
| DA01369B | 94% | 89% | 91% |
| 9AT2449A | 100% | 93% | 97% |
| PH30840A | 88% | 88% | 88% |
| 9AT5537A | 100% | 100% | 100% |
| 9AT1085A | 100% | 81% | 89% |
| 9AT2366A | 100% | 100% | 100% |
| 9BH1544A | 93% | 82% | 87% |
| AVERAGE | 96% | 93% | 94% |

*FIG. 9A*

| PREVIOUSLY KNOWN METHODOLOGY | PRECISION | RECALL | F1 ACCURACY |
|---|---|---|---|
| 9AT0775C | 80% | 80% | 80% |
| 9MT2521A | 60% | 100% | 75% |
| CH69006A | 53% | 100% | 69% |
| SE07235C | 97% | 100% | 80% |
| DA013G9D | 94% | 83% | 88% |
| 9AT2449A | 93% | 93% | 93% |
| PH30840A | 89% | 100% | 94% |
| 9AT5537A | 81% | 87% | 84% |
| 9AT1085A | 100% | 76% | 86% |
| 9AT2366A | 85% | 92% | 88% |
| 9BH1544A | 75% | 88% | 81% |
| AVERAGE | 80% | 91% | 84% |

*FIG. 9B*

AUTOMATIC INVENTORY CREATION VIA IMAGE RECOGNITION AND OVERLAY

BACKGROUND

Inventory tracking for technology migration and upgrades, such as 4G to 5G migration, is an expensive and challenging task requiring extensive staff and time. For example, on a cell tower many types of antennas, remote radio heads and other equipment are carefully inventoried before a migration plan is generated. There are dozens of equipment types—antennas alone have come in more than 10 different types. This task can take days with a team of deployment staff. A migration customer contract might involve 100s-1000s of such cell towers.

The digitization of this expensive service is now happening thanks primarily to artificial intelligence (AI)/machine learning (ML) computing technologies. For example, a drone is sent to take photos of a telecom tower from various angles and the images are sent to a data base where engineers can identify and count the equipment. The next phase of this digitization, the complete automation, involves recognition of the equipment types in the images to create a complete inventory typically in less than an hour compared to the manual, labor-intensive alternative. A typical drone image collection for a cell tower contains under 100 images of each layer (height) of equipment attached to the tower. The objective of the inventory automation task is to identify and count all the equipment as accurately as possible.

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

One or more example embodiments provide a method and apparatus for inventorying equipment from pictures of a site.

At least one example embodiments provides a method for automatically creating an equipment inventory from a plurality of images of a site. The method includes receiving, by a processor, the plurality of images of the site, labeling, by the processor, equipment present in the plurality of images of the site, creating, by the processor, an overlap curve for neighboring images of the plurality of images of the site, determining, by the processor, a useful image of at least one side of the site based on the overlap curve, the useful image including a subset of the plurality of images, creating, by the processor, an overlay of equipment in the useful image of the at least one side of the site, counting, by the processor, equipment present in the overlay of the at least one side of the site, and generating, by the processor, the equipment inventory by adding a number of equipment counted in the overlay of the at least one side of the site.

The labeling the equipment may include labeling, by the processor, the equipment present in the plurality of images using a neural network.

The creating the overlap curve may include determining, by the processor, first points occurring in one image of the plurality of images and second points occurring in another image of the plurality of images such that the first and second points are the same point in physical space, and creating, by the processor, the overlap curve based on the first and second points.

The first and second points may be determined using a scale invariant feature transform (SIFT).

The determining the useful image for the at least one side of the site may include determining, by the processor, peaks and troughs of the overlap curve, and determining, by the processor, the useful image for the at least one side based on the peaks of the overlap curve.

The method may further include, determining, by the processor, a useful image for at least one corner of the site by determining peaks and troughs of the overlap curve, and determining the useful image for the at least one corner based on the troughs of the overlap curve.

The method may further include, determining, by the processor, whether to use counts obtained from the at least one corner of the site based on the counts obtained from the images of the at least one corner of the site and the counts obtained from the images of the at least one side of the site, and creating, by the processor, the inventory using the counts obtained from the at least one corner of the site in response to a determination to use counts obtained from the corners of the site.

At least one example embodiment provides a device for inventorying equipment from a plurality of images of a site, the device including, at least one processor, and at least one memory including computer program code, the at least one memory and the computer program code configured to, with the at least one processor, cause the device to receive the plurality of images of the site, label equipment present in the plurality of images of the site, create an overlap curve for neighboring images of the plurality of images of the site, determine a useful image of at least one side of the site based on the overlap curve, the useful image including a subset of the plurality of images, create an overlay of equipment in the useful image of the at least one side of the site, count equipment present in the overlay of the at least one side of the site, and generate the equipment inventory by adding a number of equipment counted in the overlay of the at least one side of the site.

At least one example embodiment provides a non-transitory computer-readable storage medium storing computer-readable instructions that, when executed, cause one or more processors to cause an inventory generation device to perform a method for creating an equipment inventory from a plurality of images of a site, the method including receiving the plurality of images of the site, labeling equipment present in the plurality of images of the site, creating an overlap curve for neighboring images of the plurality of images of the site, determining a useful image of at least one side of the site based on the overlap curve, the useful image including a subset of the plurality of images, creating an overlay of equipment in the useful image of the at least one side of the site, counting equipment present in the overlay of the at least one side of the site, and generating the equipment inventory by adding a number of equipment counted in the overlay of the at least one side of the site.

At least one example embodiment provides a device for inventorying equipment from a plurality of images of a site, the device including a means for receiving the plurality of images of the site, a means for labeling equipment present in the plurality of images of the site, a means for creating an overlap curve for neighboring images of the plurality of images of the site, a means for determining a useful image of at least one side of the site based on the overlap curve, the useful image including a subset of the plurality of images, a means for creating an overlay of equipment in the useful image of the at least one side of the site, a means for counting equipment present in the overlay of the at least one side of the site, and a means for generating the equipment inventory by adding a number of equipment counted in the overlay of the at least one side of the site.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

The following terms may be defined as used herein:
AI—artificial intelligence
BRIEF—binary robust independent elementary features
FAST—oriented features from accelerated segment test
ML—machine learning
ORB—rotated brief
RANSAC—random sample consensus
SIFT—scale invariant feature transform
SMRH—SIFT match RANSAC homography
SURF—speeded up robust features A key challenge to accurately generating an inventory of equipment located on cell towers from images of the cell tower is to identify each piece of equipment correctly and count it only once, and not count the same piece of equipment a second time, despite its appearance in multiple images of the cell tower. This problem is particularly challenging, because equipment types are difficult to classify with arbitrary precision using a neural network, and labels generated by a neural network may therefore contain errors.

A known method for tracking objects used in surveillance applications involves object tracking techniques based on Kalman filters. In this case, the objects to be tracked may be visually distinct (e.g. tracking cars in a parking lot). However, equipment on a cell tower may not be visually distinct. For example, a cell tower may include multiple antennas of a same type that may not appear visually distinct from each other. For example, the antennas of the same type may differ from each other in a minor way based on, for example, their port configuration often not clearly visible in images.

Additionally, known methods for object tracking based on Kalman filters typically involve a stationary camera and objects (e.g., cars) that may move relative to the camera. In contrast, a typical drone image collection for a cell tower involves a sequence of images taken by the drone when it circles around the cell tower. A system, method, and apparatus for tracking and creating an inventory of equipment on a cell tower based on images collected by a drone is therefore proposed.

Figure 1:
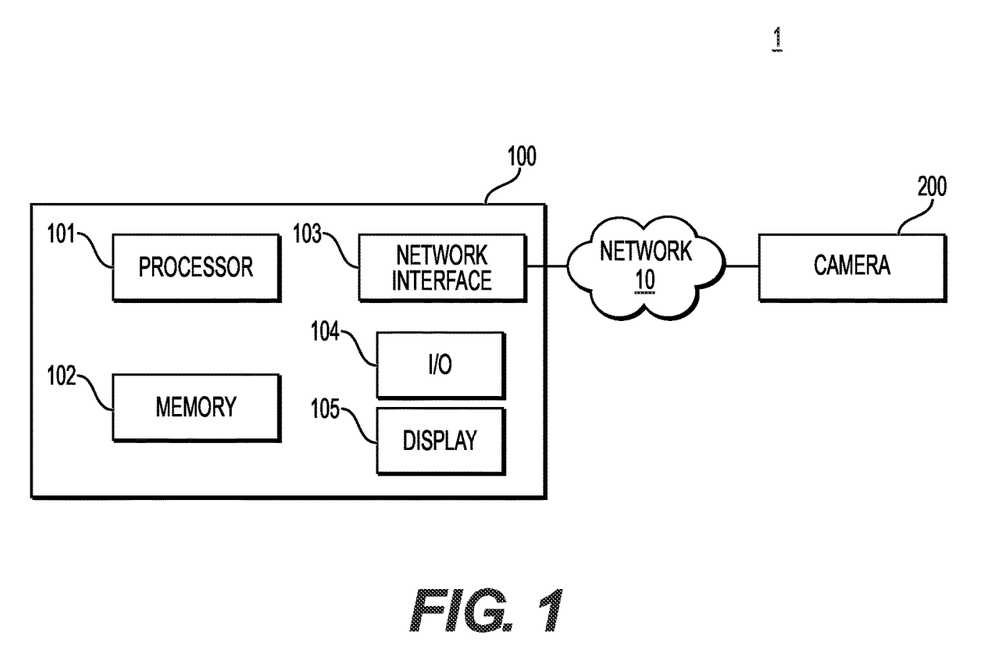
FIG. 1 is a block diagram illustrating an inventory generation system according to an example embodiment.

FIG. 1 is a block diagram illustrating an inventory generation system 1 according to an example embodiment.

As shown in FIG. 1, the inventory generation system 1 may include an inventory generation device 100 and a camera 200. The camera 200 may be, for example, attached to an aerial drone. FIG. 1 shows only one camera 200. However, example embodiments are not limited thereto, and the inventory generation system 10 may include more than one camera 200.

The inventory generation device 100 may be any one of, but not limited to, a mobile device, a smartphone, a tablet, a laptop computer, a desktop computer and/or the like. The inventory generation device 100 may include processing circuitry (such as at least one processor 101), a memory 102, at least one network interface 103, at least one I/O interface 104, and/or a display 105, etc., but the example embodiments are not limited thereto. The memory 102 may include various special purpose program code including computer executable instructions which may cause the inventory generation device 100 to perform the one or more of the methods of the example embodiments.

In at least one example embodiment, the processing circuitry may include at least one processor (and/or processor cores, distributed processors, networked processors, etc.), such as the at least one processor 101, which may be configured to control one or more elements of the inventory generation device 100, and thereby cause the inventory generation device 100 to perform various operations. The processing circuitry (e.g., the at least one processor 101, etc.) is configured to execute processes by retrieving program code (e.g., computer readable instructions) and data from the memory 102 to process them, thereby executing special purpose control and functions of the entire inventory generation device 100. Once the special purpose program instructions are loaded into, (e.g., the at least one processor 101, etc.), the at least one processor 101 executes the special purpose program instructions, thereby transforming the at least one processor 101 into a special purpose processor.

In at least one example embodiment, the memory 102 may be a non-transitory computer-readable storage medium and may include a random access memory (RAM), a read only memory (ROM), and/or a permanent mass storage device such as a disk drive, or a solid state drive. Stored in the memory 102 is program code (i.e., computer readable instructions) related to operating the inventory generation device 100, such as the methods discussed in connection with FIG. 2, and/or the at least one network interface 103, etc. Such software elements may be loaded from a non-transitory computer-readable storage medium independent of the memory 102, using a drive mechanism (not shown) connected to the inventory generation device 100, and/or via the at least one network interface 102, etc.

The inventory generation device 100 is an apparatus for generating an inventory of equipment located at a work site (e.g., equipment on a cell tower) based on a plurality of pictures received from the camera 200. As shown in FIG. 1, the inventory generation device 100 and the camera 200 may be connected to each other over a network 10. The network 10 may include one or more communications networks. For example, the network 10 may be the Internet, an intranet (e.g., an office, home, etc.), a wide area network (WAN), a metropolitan area network (MAN), local area network (LAN), wireless and/or wired, and/or one or more wireless networks, etc. The inventory generation device 100 may be connected to the network 10 via the communication interface 103. The inventory generation device 100 may receive the plurality of pictures from the camera 200 via network communication over network 10, however example embodiments are not limited thereto. For example, the inventory generation device 100 may receive the plurality of pictures from the camera 200 via a direct connection to the camera, such as a USB connection.

Example functionality of the inventory generation system 10 and its components will be described in more detail below with regard to FIG. 2.

Figure 2:
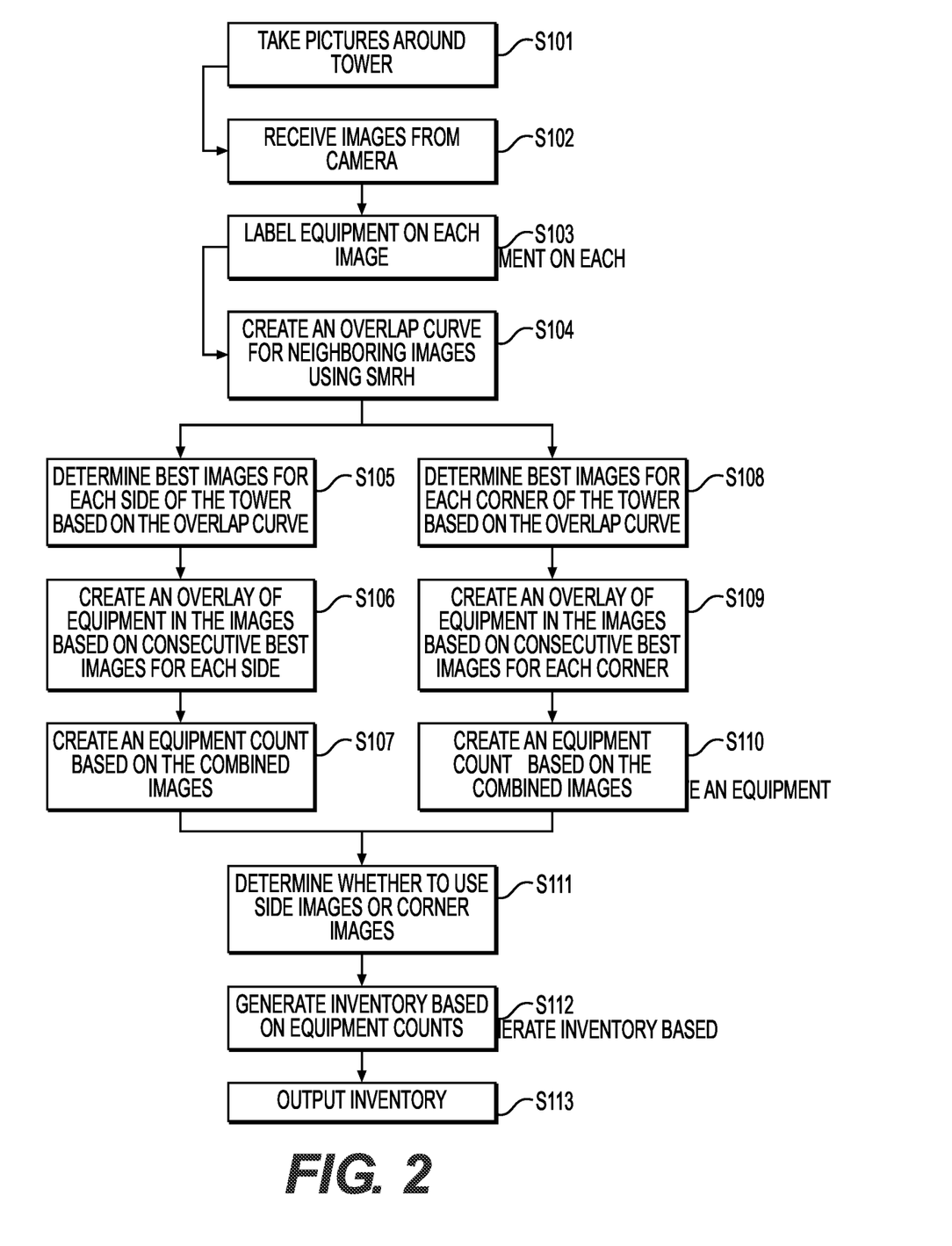
FIG. 2 is a flow chart illustrating an example embodiment of a method for generating an inventory.

FIG. 2 is a flow chart illustrating an example embodiment of a method for generating an inventory.

As described herein, example embodiments of the inventive concepts are described for generating an inventory of equipment at a cell tower. However, the inventive concepts should not be understood to be limited to the application of generating an inventory of a cell tower. The inventive concepts may be used to generate an inventory at any location.

Referring to FIG. 2, at step S101 the camera 200 captures images around a cell tower. As described above, the camera 200 may be, for example, mounted on an aerial drone.

Figure 4A:
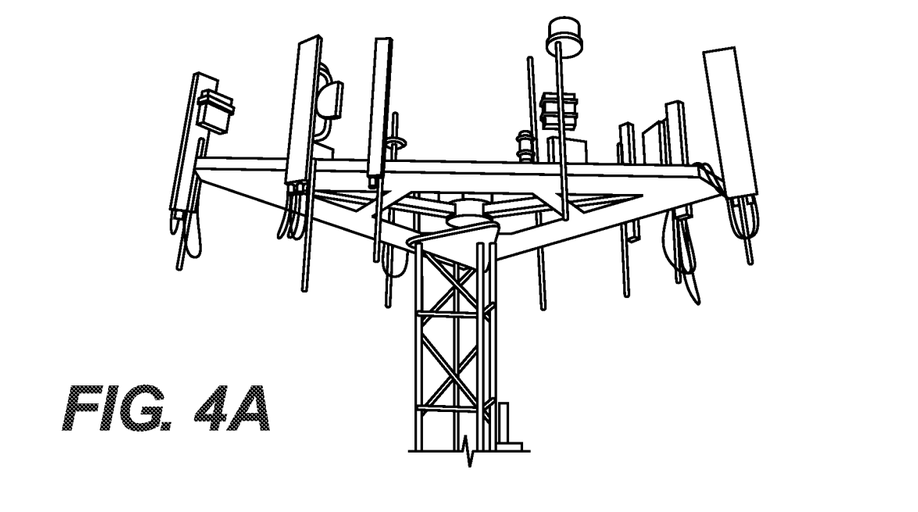
FIG. 4A illustrates an example of an image of a side view of a cell tower taken by a drone according to example embodiments.

FIG. 4A illustrates an example of an image of a side view of a cell tower taken by a drone according to example embodiments.

Figure 4B:
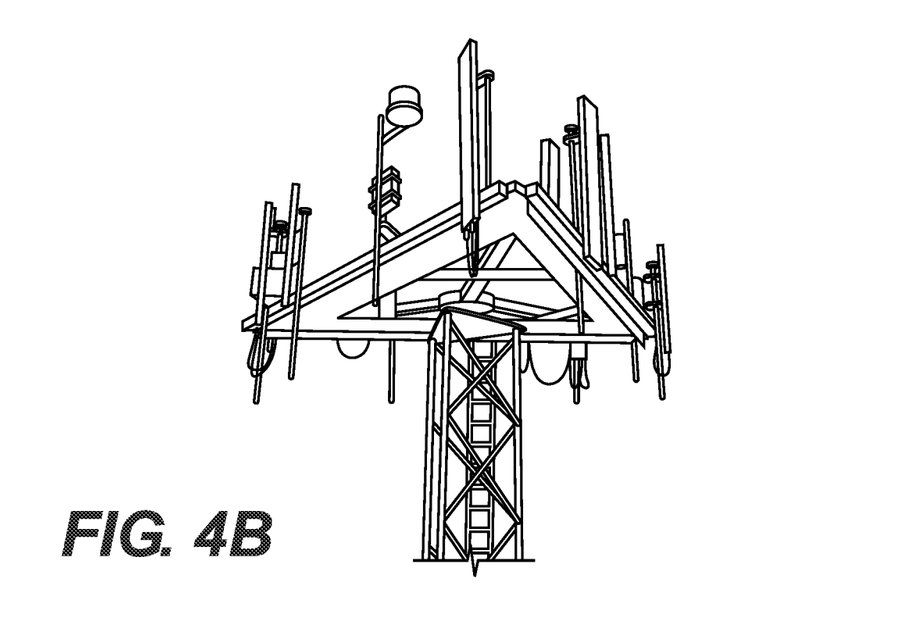
FIG. 4B illustrates an example of an image of a corner view of a cell tower taken by a drone according to example embodiments.

FIG. 4B illustrates an example of an image of a corner view of a cell tower taken by a drone according to example embodiments.

Figure 5:
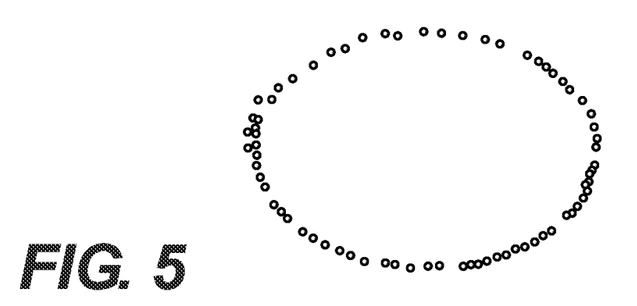
FIG. 5 illustrates an example of a trajectory for taking photos of a cell tower.

FIG. 5 illustrates an example of a trajectory for taking photos of a cell tower.

Referring to FIGS. 4A, 4B, and 5, a drone may capture images of the cell tower by flying around a cell tower in a circular or oval trajectory. Each dot shown in FIG. 5 corresponds with a drone location around a cell tower where an image similar to the images shown in FIGS. 4A-4B is captured by the drone. In some example embodiments, the drone may capture approximately 70 images of a cell tower in this manner. However, example embodiments are not limited thereto and the drone may capture more or fewer than 70 images.

Returning to FIG. 2, after the drone captures the images of the cell tower, at step S102 the inventory generation device 100 receives the images of the cell tower from the camera 200. As described above, the inventory generation device 100 may receive the images of the cell tower via the network 10, or by a direct connection to the camera 200, or by some other manner. After receiving the images of the cell tower, the images may be stored in the memory 102.

At step S103, after the inventory generation device receives the images of the cell tower, the processor 101 may label the equipment present in each, or one or more, of the images. Any known method of image recognition may be used to label the equipment in each, or one or more, image. For example, the processor 101 may use a neural network such as an object recognition neural network to label the equipment in each, or one or more, of the images. It is noted that, because equipment types are difficult to classify, the labels generated by a neural network may contain errors. Therefore, as described in more detail later, the processor 101 may perform a majority vote algorithm on the labels from consecutive images to reduce or correct labelling errors. Alternatively, or additionally, image sequences deemed insufficiently consistent may be ignored for the count harmonization process for improved accuracy.

Figure 6:
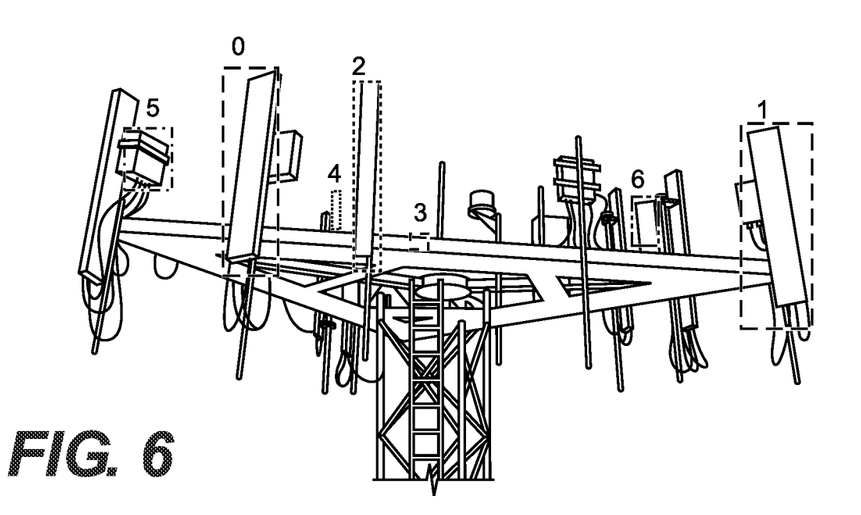
FIG. 6 is an example of the side view of the cell tower shown in FIG. 3A after it has been labeled, according to an example embodiment.

FIG. 6 is an example of the side view of the cell tower shown in FIG. 4A after it has been labeled by the processor 101 according to an example embodiment.

As shown in FIG. 6, the processor 101 may label each, or one or more, distinct equipment type with a corresponding number. The example shown in FIG. 6 includes six distinct equipment types, labeled 1-6. However, embodiments are not limited thereto. For example, an image may include more or less than six distinct equipment types. In another example embodiment, the processor 101 may label the distinct equipment types in a different manner. For example, each, or one or more, distinct equipment type may be labeled with a corresponding letter, and/or a rectangle may be drawn around each, or one or more, piece of equipment having a different color for each, or one or more, distinct equipment type, etc.

Returning to FIG. 2, at step S104 the processor 101 may create an overlap curve for neighboring images of the plurality of images.

A technique for transforming the content of one image onto another image so that elements appearing in both images are roughly coincident in the resulting combined image may be referred to as Scale Invariant Feature Transform (SIFT) Match Random Sample Consensus (RANSAC) Homography (SMRH).

Figure 3:
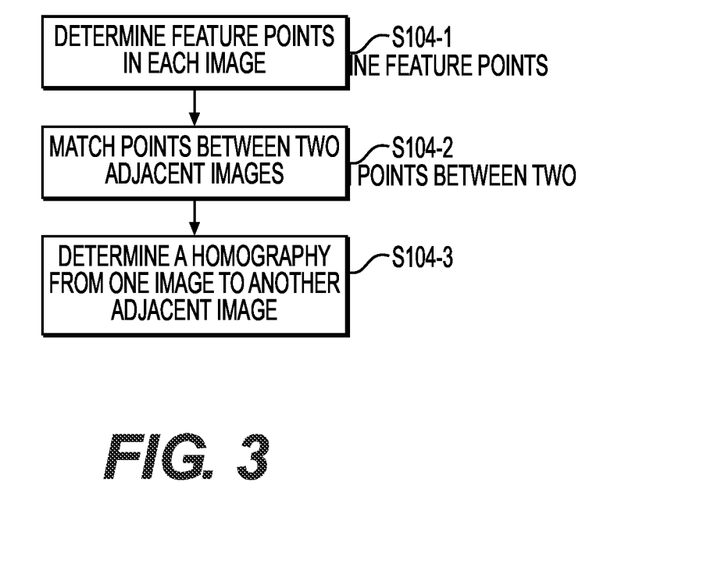
FIG. 3 is a flow chart illustrating an example embodiment of a method for performing SMRH.

FIG. 3 is a flow chart illustrating an example embodiment of a method for performing SMRH.

Referring to FIG. 3, at step 104-1, the processor 101 may determine features of points in each, or one or more, image by using a method such as (i) (SIFT), (ii) Speeded Up Robust Features (SURF) and/or (iii) Oriented Features from Accelerated Segment Test (FAST) and Rotated BRIEF (ORB) where BRIEF refers to a modified version of the visual descriptor Binary Robust Independent Elementary Features.

At step 104-2, the processor 101 may match points between two adjacent images by finding the nearest neighbors of points based on the features determined in the first step. This can be performed by brute force methods and/or using a technique based on a data structure such as k-d trees. For example, the processor 101 may determine, for a point in a first image, a distance from features (e.g. feature vectors) of the point to features (e.g. feature vectors) of each, or one or more point in an adjacent image. The processor 101 may then determine a point in the adjacent image whose features are nearest to the point in the first image. The processor 101 may repeat the above steps for each, or one or more, point in the first image.

At step 104-3, the processor 101 may determine a transformation (e.g., a homography) from one image to the other so that matched points end up in nearby positions. The processor 101 may use steps 104-1 to 104-3 to find points in two images, of the plurality of images, that are likely to be the same point in physical space. The processor 101 may repeat steps 104-1 to 104-3 for each, or one or more, set of two adjacent images, of the plurality of images, to create a harmonized image from each, or one or more, pair of adjacent images.

Some harmonized images, for example those facing a flat side of the cell tower (e.g., the image shown in FIG. 4A), give more accurate harmonized views than other harmonized images, for example those taken from a corner of the cell tower. Therefore, the processor 101 may determine images of the cell tower facing flat sides of the cell tower as best, or useful, images to use for counting the equipment, in order to generate a more accurate inventory. As used herein, the term "best images" may also mean "useful images."

Optionally, prior to using SMRH to find points in the images that are likely to be the same point in physical space, the processor 101 may remove the background (e.g., the sky and ground) from the images. Any known method for removing the background of images may be used. Removing the background from the images may force the SMRH procedure to determine matching parts of the cell tower in the images, rather than matching points of the background of the images. This may result in a more accurate homography, as described later.

To determine best images of the cell tower facing flat sides of the cell tower, the processor 101 may use a technique based on an Overlap Curve. The Overlap Curve may represent the similarity and/or the overlap amount between two successive images as a function of an index representative of an image capture position.

The processor 101 may generate the Overlap Curve can be as follows. For each, or one or more, image P_i, find a homography by, for example, using the SMRH described above, to transform image P_{i+1} onto P_i and compute a measure M(i) based on the amount of overlap of objects identified by ML as the same type of equipment in the two images. This measure could be the overlap area (raw) or the overlap area divided by the area of the smaller rectangle (normalized). Then the overlap curve (i, M(i)) can be smoothed with a technique such as Gaussian smoothing. Then a peak-finding technique can be used on the smoothed curve. For example, the processor 101 may approximate points on the smooth curve and determine points on the curve that have 0 derivative and are local maxima to be peaks. Similarly, the troughs of the overlap curve can be found by approximating points on the smooth curve and determining points on the curve that have 0 derivative and are local minima. The peaks typically determine the images facing the flat sides of the cell tower whereas the troughs typically indicate the corner images.

Figure 7:
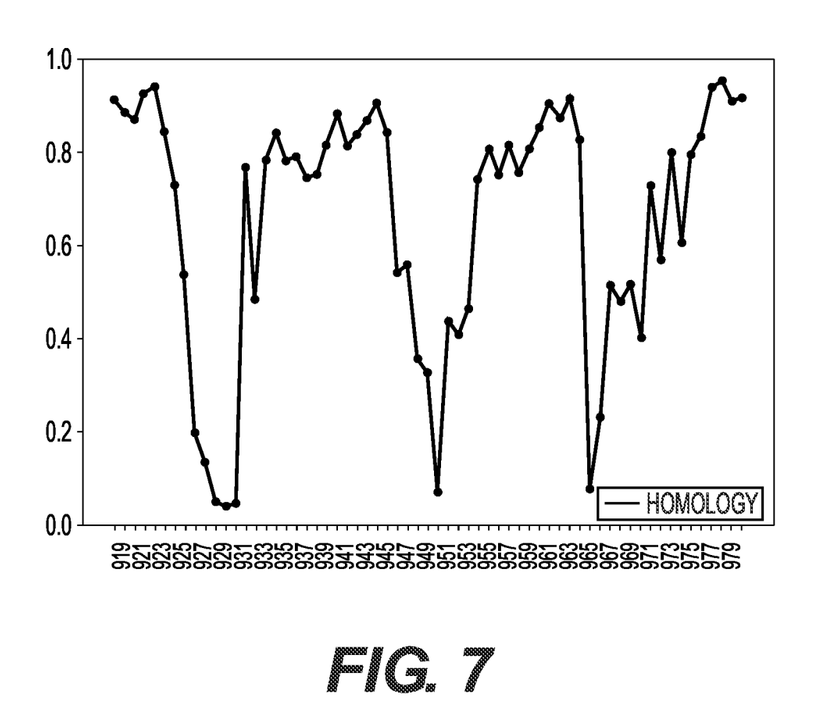
FIG. 7 illustrates an example of an overlap curve generated according to an example embodiment.

FIG. 7 illustrates an example of an overlap curve generated according to an example embodiment.

Referring to FIG. 7, peaks occurring in the overlap curve may correspond with images that show a side view of the cell tower while troughs in the overlap curve may correspond with images that show a corner view of the cell tower (e.g., the image shown in FIG. 4B).

Returning to FIG. 2, at step S105 the processor 101 may determine best images for each, or one or more, side of the tower, based on the overlap curve. To find peaks in the overlap curve corresponding with images that show a side view of the cell tower, the processor 101 may smooth the overlap curve by, for example, fitting a Gaussian curve to the overlap curve using a technique, such as Gaussian smoothing. After fitting the Gaussian curve to the overlap curve the processor 101 may determine the desired peaks corresponding with images showing a side view of the cell tower by using a package in Python™ (e.g., PeakUtils). However, example embodiments are not limited thereto. For example, any known method for determining well-separated peaks in a smooth curve may be used.

As shown in FIGS. 4A-4B, a cell tower may have a triangle shape including three sides. However, example embodiments are not limited thereto, and the cell tower may have a shape different from those pictured. Further, a cell tower may have more or less than three sides.

From the images determined to be a side view of the cell tower, the processor 101 may select a number of consecutive images for each, or one or more, side of the cell tower. For example, the processor 101 may select two images of each, or one or more, side of the cell tower. However, example embodiments are not limited thereto and the processor 101 may select more than two images of each, or one or more, side of the cell tower. According to an embodiment, the processor 101 may select an image from a left and a right of each, or one or more, side of the cell tower.

Returning to FIG. 2, at step S106 the processor 101 may create one or more overlays from images of each, or one or more, side of the cell tower from the selected images. The images in the sequence of images that are nearby to the image that corresponds to a peak in the overlap curve are from the same side. The processor 101 may determine a number of sides of the tower by counting the number of prominent peaks in the overlap curve. Alternatively, the number of sides may be manually entered by an operator.

Once the number of sides are determined, the processor 101 may create the overlays according to any known method. According to an example embodiments, the processor 101 may use the homography transformations generated by SMRH, as described with reference to FIG. 3 above, to create one or more overlays of images from each, or one or more, side.

Figure 8A:
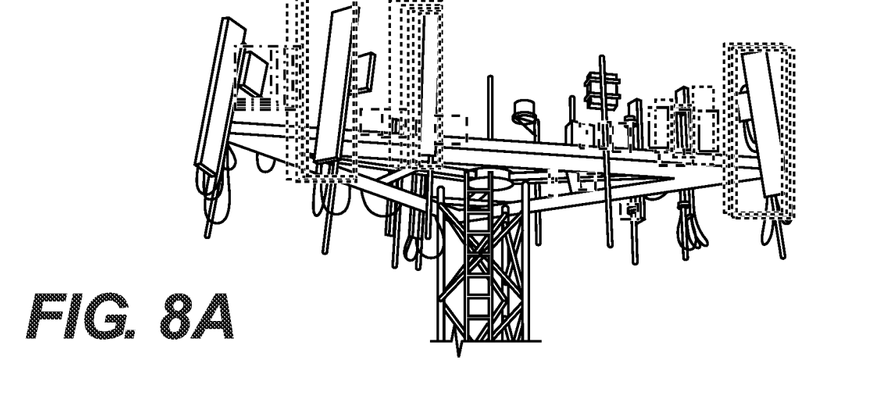
FIGS. 8A-8C are examples of an overlay of a first side, a second side, and a third side of a cell tower.
Figure 8B:
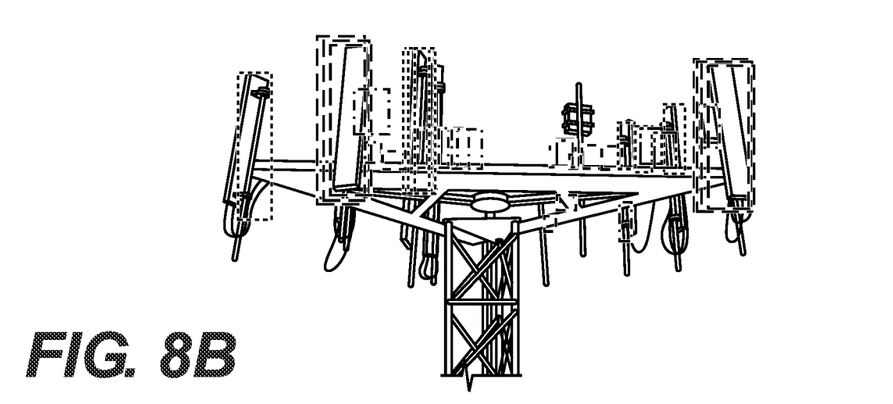
Figure 8C:
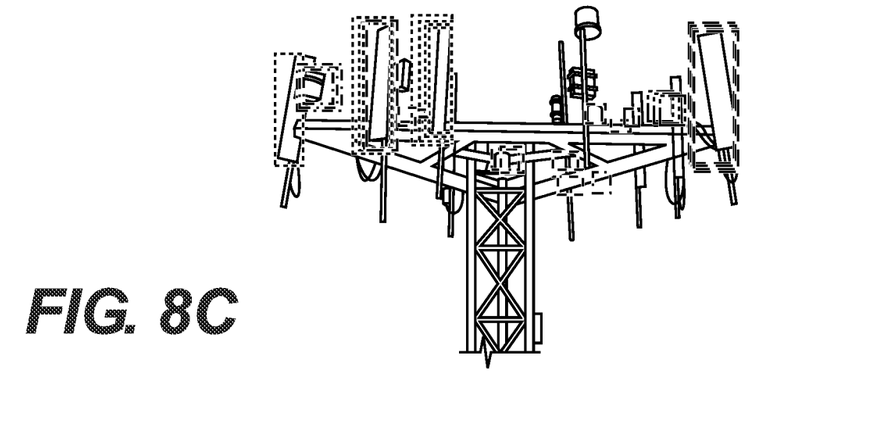

FIGS. 8A-8C are examples of an overlay of a first side, a second side, and a third side of a cell tower.

Returning to FIG. 2, at step S107 the processor 101 may count the equipment in each, or one or more, overlay. The images in the sequence of images that are nearby to the image that corresponds to a peak in the overlap curve are all from the same side. The processor 101 may determine a number of sides of the tower by counting the number of prominent peaks in the overlap curve. Alternatively, the number of sides may be manually entered by an operator.

Once the number of sides are determined, the processor 101 may use a majority rule algorithm to vote for the equipment in each, or one or more, overlay. For example, the processor 101 may use a Boyer-Moore majority vote algorithm to vote for the equipment in each, or one or more, overlay. This creates an equipment count for each, or one or more, side of the cell tower.

For example, the overlay of the first side shown in FIG. 8A includes 1 blue equipment, 2 green equipment, 1 black equipment, and 1 red equipment. The overlay of the second side shown in FIG. 8B includes 2 red equipment, 1 green equipment, and 1 blue equipment. The overlay of the third side shown in FIG. 8C includes 1 blue equipment, 2 green equipment, 1 black equipment, and 1 red equipment. Therefore, the processor 101 may count inventory associated with each side independently. Counting the inventory associated with each side independently may increase the accuracy of the inventory count.

A minority of sites may have equipment mounted on the corners of the cell tower (e.g., the corners of a triangular structure). This sometimes causes double counting at step S107. For example, an equipment located at the corner of the first side and the second side may be counted a first time when counting the equipment shown in the overlay of the first side and may be counted a second time when counting the equipment shown in the overlay of the second side.

In order to determine whether equipment located at the corners of the cell towers is being double counted, the processor 101 may compare equipment counts obtained from side views of the cell tower with equipment counts obtained from corner views of the cell tower. The method for determining whether equipment located at the corners is being double counted will be described more fully later.

Still referring to FIG. 2, at step S108 the processor 101 may determine best images for each, or one or more, corner of the cell tower, based on the overlap curve. As discussed above, peaks occurring in the overlap curve may correspond with images that show a side view of the cell tower while troughs in the overlap curve may correspond with images that show a corner view of the cell tower. The processor 101 may identify best images of the corners of the cell tower by identifying troughs in the overlap curve. As the method for identifying best images for each corner is the same or more, substantially similar to the method for identifying best images for each side (as in step S105), a detailed description is omitted.

At step S109, the processor 101 may create an overlay of each, or one or more, corner of the cell tower from the selected images. As the method for creating an overlay of each corner is the same or substantially similar to the method for creating an overlay of each side (as in step S106), a detailed description is omitted.

At step S110, the processor 101 may use a majority rule algorithm to vote for the equipment in each, or one or more, overlay. As the method for voting for the equipment in each overlay of the corners is the same or substantially similar to the method for voting for the equipment in each overlay of the sides (as in step S107), a detailed description is omitted.

At step S111, the processor 101 may determine whether equipment counts obtained from the side views include double counting of equipment located on the corners of the cell tower. If an equipment type is counted twice or approximately twice as many times from the side views as it is counted from the corner views, the processor 101 determines that equipment located at the corners of the cell tower are being double counted. In this case, the counts obtained from the corner views are used. Otherwise, if an equipment type is not counted twice or approximately twice as many times from the side views as it is counted from the corner views, the counts obtained from the side views are used.

At step S112, the inventory generation unit may generate the inventory by summing the counts of equipment obtained from each, or one or more, side or from each, or one or more, corner.

At step S113, the processor 101 may output the inventory. For example, the processor 101 may write the inventory to the memory 102, the processor 101 may cause the device to send the inventory to another device via the network interface 103, and/or may cause the inventory generation device 100 to display the inventory on the display 105, etc.

Therefore, the inventory generation system 1 according to example embodiments may automatically generate an inventory of equipment located at a work site with increased accuracy.

For a site upgrade, it is desired to know what equipment already exist on the tower in order to determine new equipment to be installed at the tower. Therefore, an operator may use the inventory generated according to example embodiments to more accurately determine new equipment to order to for a site upgrade. Further, when equipment is to be replaced, (e.g., due to known faults in the equipment and/or vendor changes, etc.) operators often do not have accurate inventory due to changes made to the tower over time. The inventory generated according to example embodiments may be used to more accurately keep inventory up to date for purpose of upgrades and general inventory. For example, the installers may use the generated inventory when installing new equipment and/or replacing equipment.

Figure 9A:
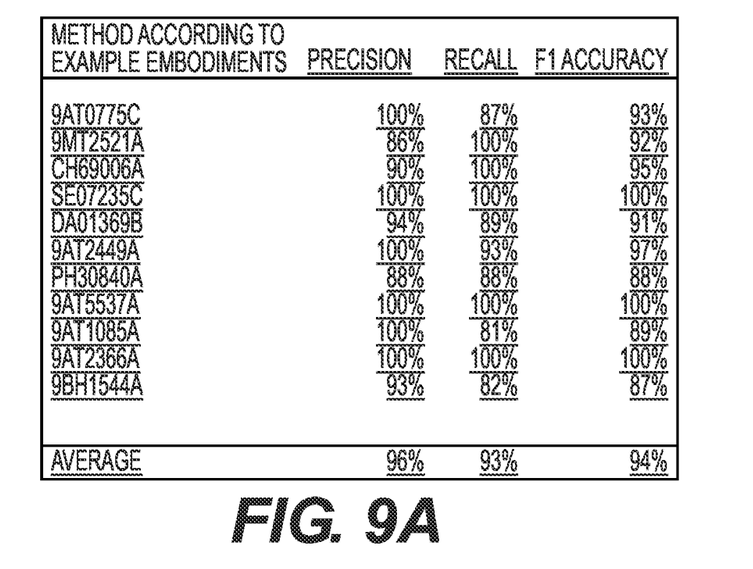
FIG. 9A shows results obtained by automatically inventorying cell towers according to example embodiments described herein.

FIG. 9A shows results obtained by automatically inventorying cell towers according to example embodiments described herein.

Figure 9B:
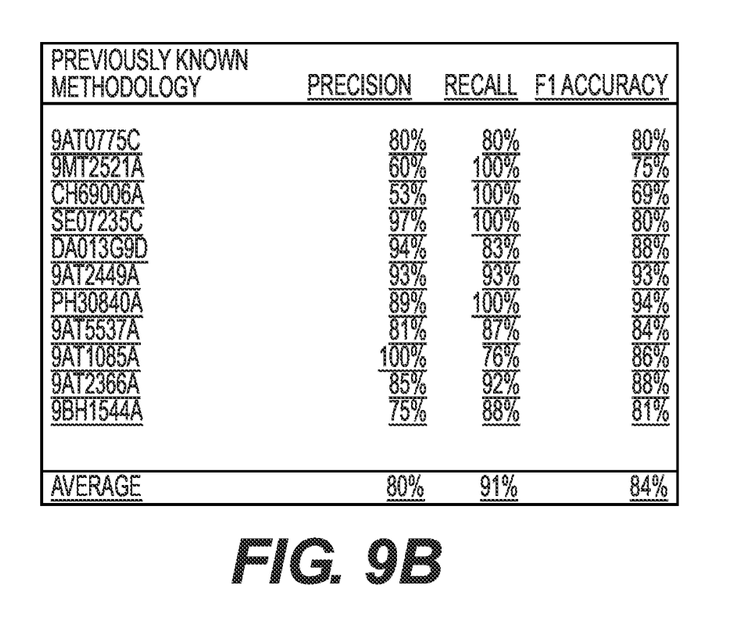
FIG. 9B shows comparative results obtained using previously known methodology.

FIG. 9B shows comparative results obtained using previously known methodology.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method, by a processor, for automatically creating an equipment inventory from a plurality of images of a site, the method comprising:
    receiving the plurality of images of the site;
    labeling equipment present in the plurality of images of the site;
    creating an overlap curve for neighboring images of the plurality of images of the site, the overlap curve representing an overlap amount between two successive images as a function of an index representative of an image capture position;
    determining a side image of at least one side of the site based on the overlap curve, the side image including a subset of the plurality of images by determining peaks and troughs of the overlap curve and determining the side image based on the peaks of the overlap curve;
    creating an overlay of equipment in the side image of the at least one side of the site;
    counting equipment present in the overlay of the at least one side of the site; and
    generating the equipment inventory by adding a number of equipment counted in the overlay of the at least one side of the site.

2. The method of claim 1, wherein the labeling the equipment comprises labeling the equipment present in the plurality of images using a neural network.

3. The method of claim 1, wherein the creating the overlap curve comprises:
    determining first points occurring in one image of the plurality of images and second points occurring in another image of the plurality of images such that the first and second points are the same point in physical space; and
    creating the overlap curve based on the first and second points.

4. The method of claim 3, wherein the first and second points are determined using a scale invariant feature transform.

5. The method of claim 1, further comprising:
    determining a corner image for at least one corner of the site by determining the corner image for the at least one corner based on the troughs of the overlap curve.

6. The method of claim 5, further comprising:
    determining whether to use counts obtained from the at least one corner of the site based on the counts obtained from the images of the at least one corner of the site and the counts obtained from the images of the at least one side of the site; and
    creating the inventory using the counts obtained from the at least one corner of the site in response to a determination to use counts obtained from the at least one corner of the site.

7. A device for inventorying equipment from a plurality of images of a site, the device comprising:
    at least one processor; and
    at least one memory including computer program code, the at least one memory and the computer program code configured to, with the at least one processor, cause the device to
    receive the plurality of images of the site,
    label equipment present in the plurality of images of the site,
    create an overlap curve for neighboring images of the plurality of images of the site, the overlap curve representing an overlap amount between two successive images as a function of an index representative of an image capture position,
    determine a side image of at least one side of the site based on the overlap curve by determining peaks and troughs of the overlap curve and determining the side image based on the peaks of the overlap curve, the side image including a subset of the plurality of images,
    create an overlay of equipment in the side image of the at least one side of the site, count equipment present in the overlay of the at least one side of the site, and
    generate the equipment inventory by adding a number of equipment counted in the overlay of the at least one side of the site.

8. The device according to claim 7, wherein the at least one memory and the computer program code are further configured to, with the at least one processor, cause the device to label the equipment present in the plurality of images using a neural network.

9. The device according to claim 7, wherein the at least one memory and the computer program code are further configured to, with the at least one processor, cause the device to create the overlap curve by:
    determining first points occurring in one image of the plurality of images and second points occurring in another image of the plurality of images such that the first and second points are the same point in physical space; and
    creating the overlap curve based on the first and second points.

10. The device according to claim 9, wherein the first and second points are determined using a scale invariant feature transform.

11. The device according to claim 7, wherein the at least one memory and the computer program code are further configured to, with the at least one processor, cause the device to determine a useful image for at least one corner of the site by:
    determining a corner image for the at least one corner based on the troughs of the overlap curve.

12. The device according to claim 11, wherein the at least one memory and the computer program code are further configured to, with the at least one processor, cause the device to:
    determine whether to use counts obtained from the at least one corner of the site based the counts obtained from the images of the at least one corner of the site and the counts obtained from the images of the at least one side of the site; and
    create the inventory using the counts obtained from the at least one corner of the site in response to a determination to use counts obtained from the at least one corner of the site.

* * * * *